(12) United States Patent
Gupta et al.

(10) Patent No.: US 6,704,786 B1
(45) Date of Patent: Mar. 9, 2004

(54) NETWORK AND END-HOST EFFICIENCY FOR WEB COMMUNICATION

(75) Inventors: Amit Gupta, Fremont, CA (US); Israel Cidon, Haifa (IL); Raphael Rom, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 952 days.

(21) Appl. No.: 08/990,759

(22) Filed: Dec. 15, 1997

(51) Int. Cl.[7] .............................................. G06F 15/16
(52) U.S. Cl. ...................... 709/228; 709/227; 709/230
(58) Field of Search ................................. 709/203, 227, 709/228, 230, 239, 250, 240

(56) References Cited

U.S. PATENT DOCUMENTS

| 5,426,427 A | * | 6/1995 | Chinnock et al. | 709/239 |
| 5,710,908 A | * | 1/1998 | Man | 709/230 |
| 5,909,493 A | * | 6/1999 | Motoyama | |
| 5,919,250 A | * | 7/1999 | Shimokawa | 709/250 |
| 5,920,705 A | * | 7/1999 | Lyon et al. | 709/240 |

* cited by examiner

Primary Examiner—Marc D. Thompson
(74) Attorney, Agent, or Firm—Rosenthal & Osha L.L.P.

(57) ABSTRACT

Network and host efficiencies are improved by reducing the overhead associated with establishing virtual circuits. In one approach, a request for information from a client is sent to a server using a connectionless protocol such as UDP. If the requested information satisfies a policy for return by the connectionless protocol, the response is sent that way. If the policy is not satisfied, the server may reply with a message to try a connection oriented protocol such as TCP. If no response is received at all after a certain number of tries, the client will try a connection using a connection oriented protocol. In a second approach, when a request from a client is sent using a connectionless protocol, the state information for a transaction TCP (T/TCP) connection is set up in the client, giving the server the option of responding either using the connectionless protocol or using T/TCP. Transparent proxies can be conveniently implemented which will handle asymmetric connections and efficiently return cached information.

9 Claims, 10 Drawing Sheets

FIG. 12 http-tcp://www.sun.com

FIG. 13A http-udp://www.sun.com

FIG. 13B http-default://www.sun.com

FIG. 13C http redirected to "http-tcp://www.destination.com"

FIG. 14A http redirected to "http://server/page" parameter

FIG. 14B

NETWORK AND END-HOST EFFICIENCY FOR WEB COMMUNICATION

BACKGROUND OF THE INVENTION

1. Field of the Invention

The invention relates to telecommunications and, more particularly, to improving client server interactions by permitting those interactions to occur with increased efficiency and reduced network resources.

2. Description of Related Art

Communication networks are well known in which a connected device, such as a personal computer, runs a client process, such as a network browser, which engages in interactions with a server which provides information in response to the client. One such network is the Internet. The worldwide web portion of the Internet constitutes over one half of the traffic carried by the Internet. Users of such networks experience slowed response times as load on the network increases.

Communication services are implemented over a network by utilizing protocols. Two well known network protocols are TCP and IP (Transmission Control Protocol and Internet Protocol respectively). Another type of known protocol is UDP (User Datagram Protocol) which is frequently if not generally bundled with TCP and IP. IP is a network layer protocol while TCP and UDP are transport level protocols, that is, they provide the services needed for end to end communications at the transport layer of the International Standards Organization, Open Systems Interconnect (ISO OSI) model.

One approach to overcoming problems of inefficiency when setting up TCP virtual connections in a transactional environment is provided by RFC 1644 from the Network Working Group as discussed in a paper by R. Bradden dated July, 1994 and entitled T/TCP—TCP Extensions for Transactions Functional Specification. That article is hereby incorporated by reference and is attached hereto as Appendix A.

Higher levels of protocols are also known which accommodate functionality at the session, presentation and application layers of the ISO OSI model. One of these layers is HTTP (Hypertext Transfer Protocol) which is utilized in the transfer of information in client server interactions in the worldwide web.

The hardware components for implementing networks are also well known. Of principal interest for network uses in this context are routers which are utilized to direct digital packets being sent on the network from a point of origin towards their destination. A router may frequently have additional functionality other than that associated with simple routing. For example, some routers accommodate Network Address Translation (NAT) and load-balancing.

The Problems

There are several problems associated with the prior art. First, when transferring data using TCP a virtual circuit must first be established. Then the data is transferred followed by a teardown of the virtual circuit. This introduces substantial overhead in network interactions.

This overhead is increased yet further when distributed servers are utilized and when a server to which a client is connected redirects the connection from itself to a different server for obtaining the information.

A third problem associated with the prior art is that reducing network traffic using transparent proxies requires constraints on the network topology or traffic routing. It would be desirable to free transparent proxies from such constraints.

SUMMARY OF THE INVENTION

In accordance with the invention, new protocol interactions are defined for reducing network traffic, particular in a worldwide web environment. In accordance with the invention, the user first attempts to retrieve information by using HTTP and UDP (hereinafter HTTP-UDP) This eliminates the need for the virtual connection setup and teardown portions of the TCP protocol. If the HTTP-UDP interaction fails or if a response is received indicating that the return information is beyond the size limits for a UDP transaction, the required process falls back to an HTTP-TCP request to get the desired information. The HTTP-TCP request behaves exactly like the TCP interactions in use today.

Another aspect of the invention relates to a three step fall back protocol in which a HTTP-UDP request goes out and transaction TCP (T/TCP) state information is established in the client's side which can be utilized in the event that a response may not be handled by UDP. If the server is equipped with transaction TCP (T/TCP), T/TCP can be utilized for the response without the need to go through the formal set-up since this data information is already available and stored on the client's side. If neither approach is available, then HTTP-TCP will be utilized to obtain the information.

In another aspect of the invention, transparent web proxy functions are defined which permit a router to cache information and provide it from a router to a client without connection to the server at all. Thus acting as a transparent proxy.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
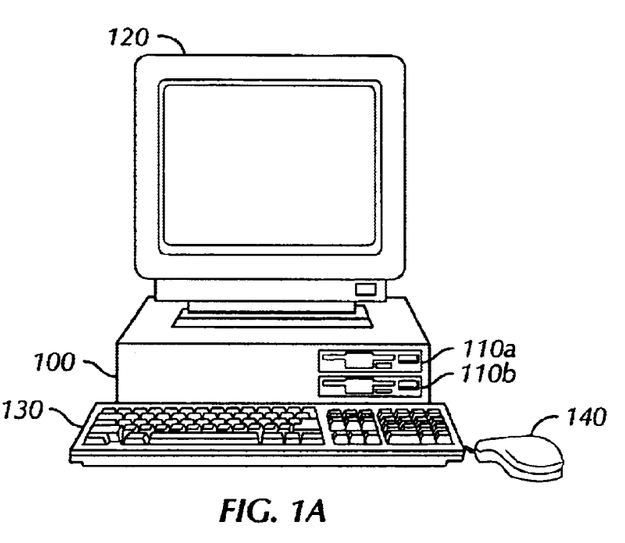
FIG. 1A is a view of exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has a display 120 upon which information is displayed. A keyboard 130 and a mouse 140 are typically also available as input devices. Preferably, the computer illustrated in FIG. 1A is a SPARC™ workstation from Sun Microsystems, Inc.

Figure 1B:
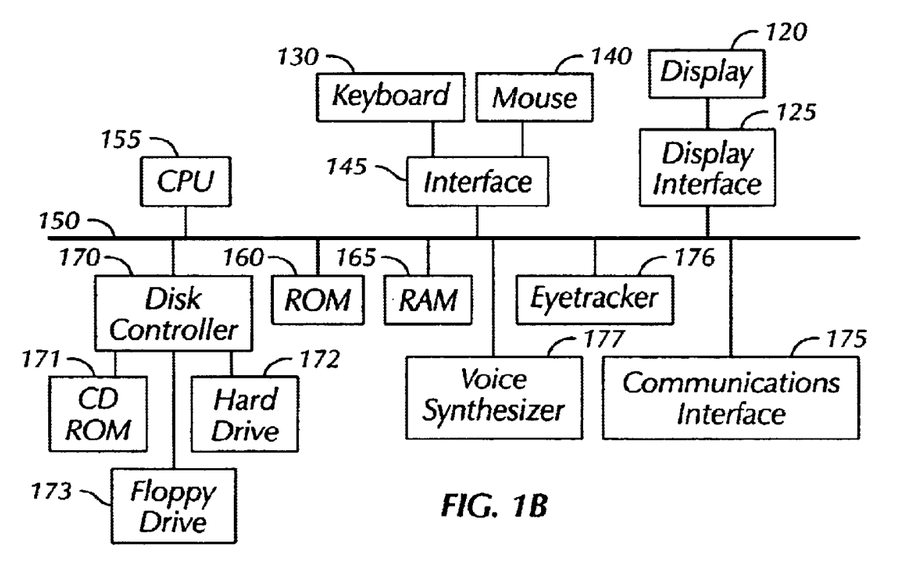
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. Communications with external devices can occur over a communications port such as communications interface 175.

The invention is related to the use of a computer system. According to one embodiment of the invention, instructions may be read into main memory from another computer-readable medium, such as a storage device. Execution of the sequences of instructions contained in main memory causes the processor to perform the process steps described herein. One or more processors in a multi-processing arrangement may also be employed to execute the sequences of instructions contained in main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks. Volatile media includes dynamic memory, such as main memory 165. Transmission media includes coaxial cables, copper wire and fiber optics, including the wires that comprise bus 150. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, and other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor for execution. For example, the instructions may initially be carried on a magnetic disk of a remote computer. The remote computer can load the instructions into its dynamic memory and send the instructions over a telephone line using a modem. A modem local to computer system can receive the data on the telephone line.

The computer system also includes a communication interface 175 coupled to bus 150. Communications interface 175 provides a two-way data communication coupling to a network 190 (see FIG. 1D). For example, communication interface 175 may be integrated services digital network (ISDN) card or modem to provide a data communication connection to a corresponding type of telephone line. As another example, communication interface 175 may be a local area network (LAN) card to provide a data communication connection to a compatible LAN. Wireless links may also be implemented. In any such implementation, communication interface 175 sends and receives electrical, electromagnetic or optical signals that carry digital data streams representing various types of information.

The connection linking computer 100 with the network 190 typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". Local network and the Internet both use electrical, electromagnetic or optical signals that carry digital data streams. The signals through the various networks and the signals on network link and through communication interface, which carry the digital data to and from computer system, are exemplary forms of carrier waves transporting the information.

The computer system can send messages and receive data, including program code, through the network(s), network link and communication interface. In the Internet example, a server might transmit requested code for an application program through Internet, ISP, local network and communication interface.

The received code may be executed by the processor as it is received, and/or stored in a storage device, or other non-volatile storage for later execution. In this manner, the computer system may obtain application code in the form of a carrier wave.

Figure 1C:
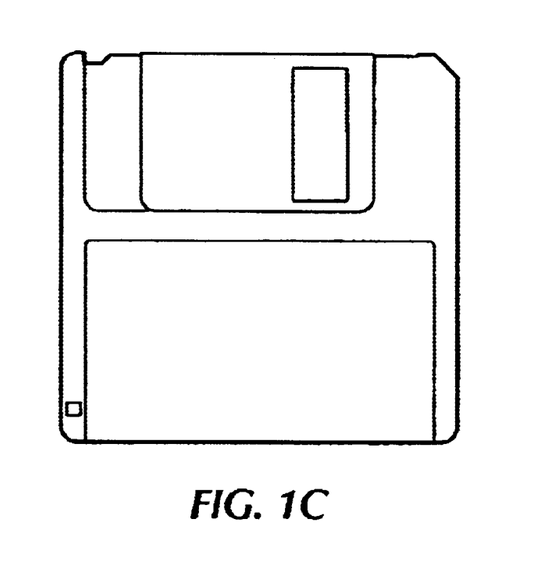
FIG. 1C is an illustration of an exemplary memory medium suitable for storing program and data information in accordance with the invention.
Figure 1D:
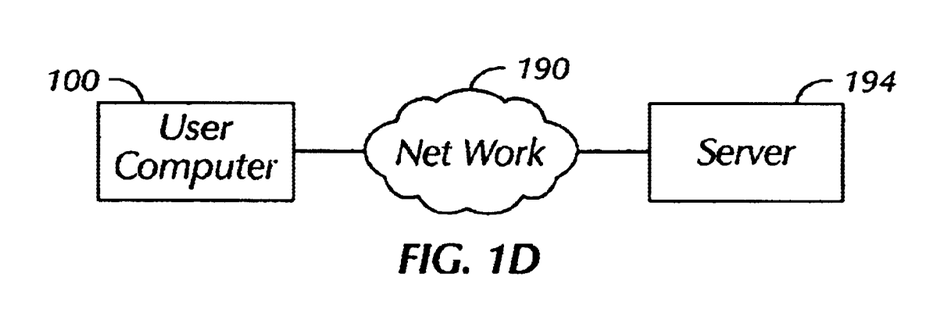
FIG. 1D is a block diagram of a network architecture suitable for carrying data and programs in accordance with some aspects of the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

FIG. 1D is a block diagram of a network architecture suitable for carrying data and programs in accordance with some aspects of the invention. A network 190 serves to connect a user computer 100 with either a server 194 for the download of program and data information.

In one operational mode, the network 190 can connect to user computer 100 with a server such as 194 to download program and data information needed for carrying out the invention.

Figure 2:
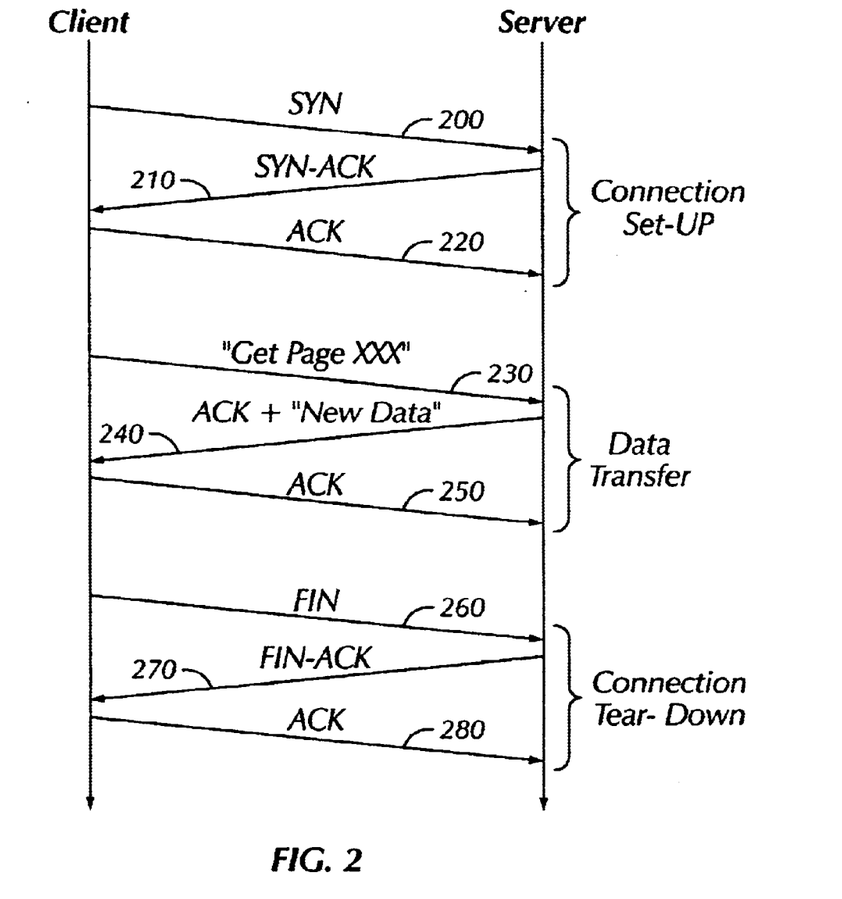
FIG. 2 illustrates a TCP data transfer used as a fall back in accordance with one aspect of the invention when a UDP transfer cannot be effected.

FIG. 2 illustrates a TCP data transfer use as a fall back in accordance with one aspect of the invention when a UDP data transfer cannot be affected. The vertical line to the left of FIG. 2 represents the client and the vertical line to the right represent the server who are engaged in interaction as indicated; time progresses from top to bottom in FIG. 2. The client sends a SYN packets (Synchronization Packet) to the server (200). This initiates a request that a connection be established from client to server. The server responds with a SYN-ACK packet which is a request for a connection in the other direction (from the server to the client) and an acknowledgment of the set-up of a connection from the client to the server at the server end (210). The client then responds with an ACK (220) which acknowledges to the server that the connection requested has been set-up. The interchange of these three packets constitutes a connection set-up phase at the end of which, a virtual circuit has been established in each direction between client and server and between server and client. The client then requests a page (document, data) from the server using the GET PAGE XXX request (230). The server sends an ACK acknowledging the page request together with the data which responds to that request in one or more packets (240). Acknowledgments are generated as data packets are received in a manner specified in the TCP protocol. When the final acknowledgement is sent from the client to the server (250) the data transfer phase of the connection has been completed. With the last data packet acknowledged, the client sends a FIN packet (260) to the server indicating that the connection is finished. The server responds with a FIN-ACK packet which acknowledges the FIN packet of the client and indicates to the client that the use of the reverse direction connection is also finished (270). When the client acknowledges the FIN-ACK packet from the server (280), the connection is terminated and the connection tear down phase is completed.

Thus, one can see from FIG. 2 that a minimum of nine packets of information must be exchanged in order to do a simple data transfer using TCP. This overhead is excessive, as recognized by the inventors, in most cases since most data transfers between client and server in a World Wide Web or similar environment involve very small amounts of data. To reduce this excessive overhead, the inventors utilize UDP to initiate a HTTP GET request over the network. UDP is a connectionless data protocol; that is, packets are transferred without establishing a virtual circuit.

Figure 3A:
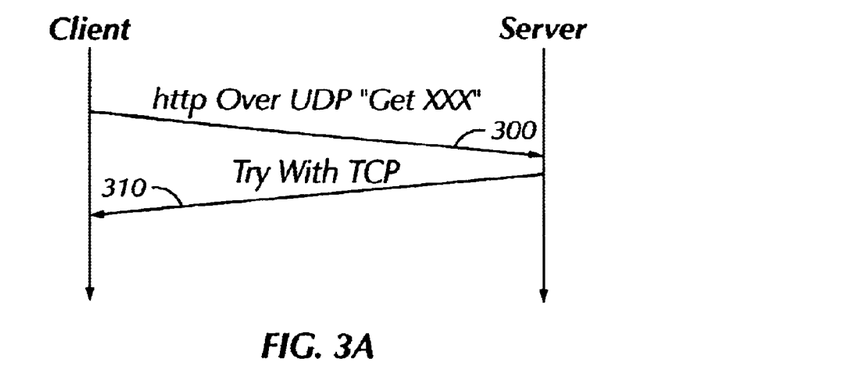
FIG. 3A illustrates a communications sequence in accordance with one aspect of the invention utilized when a UDP data transfer fails.

FIG. 3A illustrates a communication sequence in accordance with one aspect of the invention for use when a UDP data transfer fails. In this figure and in FIG. 3B, time progresses from top to bottom of the figure. As shown in FIG. 3A, the client sends a query packet such as an HTTP GET request to a remote station such as a server using UDP (300). That request can fail for several reasons; for example, the packet may never arrive at the server. In accordance with the invention, the client sets a timer when the packet is sent. If the packet never arrives, there will be no response and the timer will time out indicating to the client to try a different approach. However, if the packet arrives at the server, and if the server so chooses, it can respond with a UDP message to try TCP for the data transfer (310) (for example, if the information requested at the server is too large to be accommodated by a UDP return packet). A number of different policies are possible for determining when to respond with a "Try TCP" message. The one described is merely exemplary. The client would then respond by initiating the sequence of packets shown in FIG. 2. Otherwise, the server will respond utilizing UDP to send the data requested by the server.

Figure 3B:
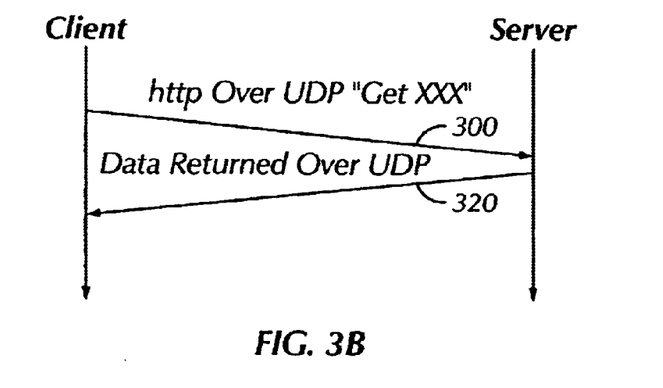
FIG. 3B illustrates a communication sequence in accordance with one aspect of the invention when a UDP data transfer succeeds.

Substantially half the connections established across the World Wide Web can be serviced with the UDP data transfers shown in FIG. 3B, thus obviating the considerable overhead required by a TCP data transfer such as shown in FIG. 2.

Figure 4:
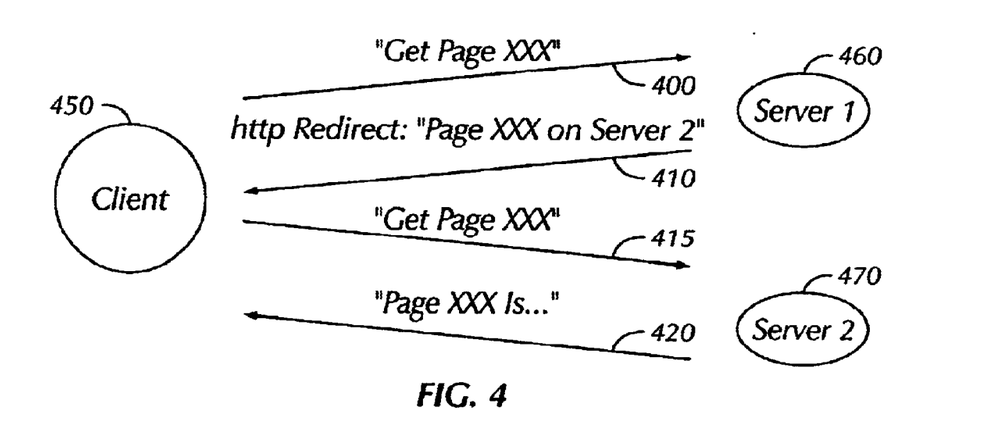
FIG. 4 illustrates a communication sequence followed when a HTTP redirect is encountered.

FIG. 4 illustrates a communication sequence followed when an HTTP redirect is encountered. In accordance with the invention, a client 450 issues an HTTP GET request (400) to server 1 (460). Server one, however, knows that the information requested is available on server 2 (470) or that even though the information is available on server 1, the amount of traffic being serviced by server 1 is such that it might be preferable to redirect the request to server 2. Thus the sever 1 (460) responds with an HTTP redirect (410) directing the client to seek the information from server 2. The client 450 then issues an HTTP GET request to sever 2 over UDP and server 2 responds utilizing the UDP process as set forth in FIGS. 3A and 3B. If the process described in FIG. 4 were done using TCP, there would have been a minimum of eighteen packets transferred to setup, first, a virtual connection between client 450 and server 1 460 followed by a connection between client 450 and server 2 (470). However, utilizing UDP with TCP fall back, the entire redirect process can be done in as few as four packets. Thus, the overhead is substantially reduced.

Figure 5:
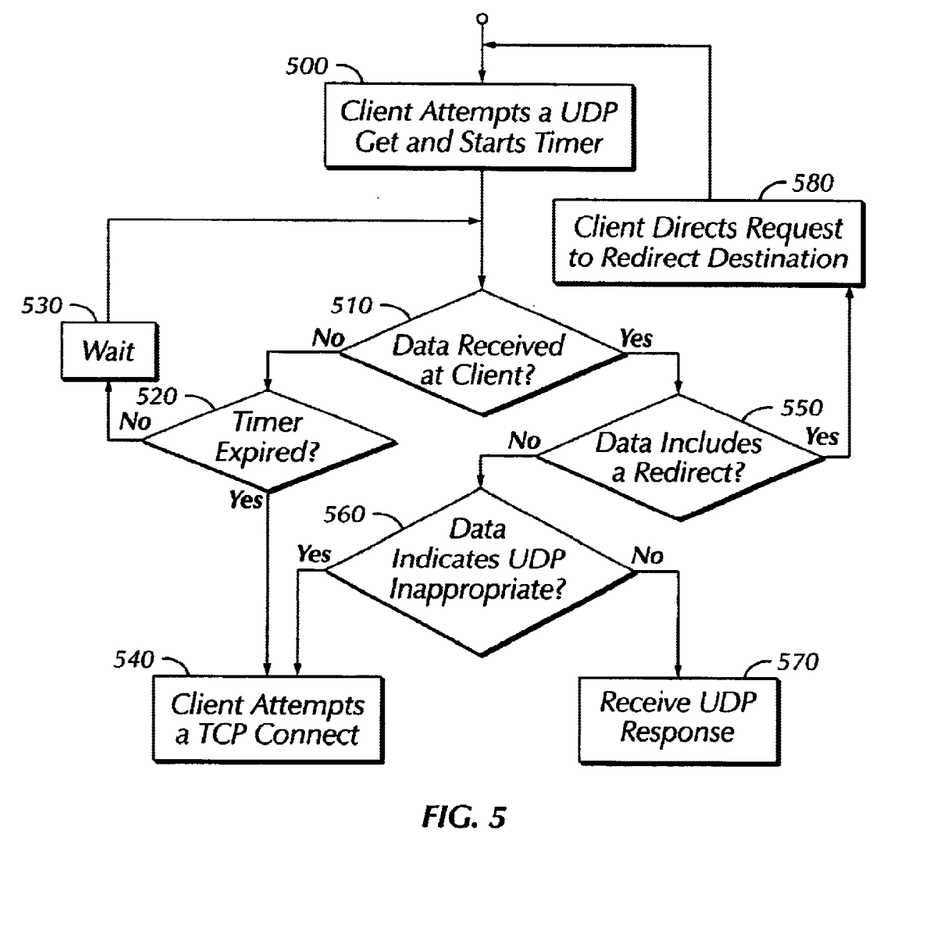
FIG. 5 is a flow chart of a protocol used in accordance with one aspect of the invention.

FIG. 5 is a flow chart of a protocol used in accordance with one aspect of the invention. When a client wishes to issue a HTTP GET request or otherwise wishes to communicate, the client uses UDP to issue the GET request and the client starts a timer (500). If data is not received at the client in response to the request (510-N) the state of the timer is checked to see if it has timed out. If it has not timed out (520-N) a certain amount of time is expended in a wait state (530) prior to checking again to see if data has been received. If the timer has expired (520-Y), the client will attempt a TCP connect 540. Alternatively, this attempt may be made after a plurality of UDP attempts. If data is being received at the client (510-Y), a check is made to see if the data includes a redirect (550). If it does not (550-N), the data is checked to see if it indicates that a UDP transfer is inappropriate (560). If it is (560-Y), the client will attempt a TCP connect as before (540). If a UDP connect is appropriate (560-N), the UDP response will be received (570) and the transaction is complete. If the received data includes a redirect (550-Y), the response will direct the client to connect to the redirect destination (580) and the client will then attempt to connect to the revised destination.

Figure 6:
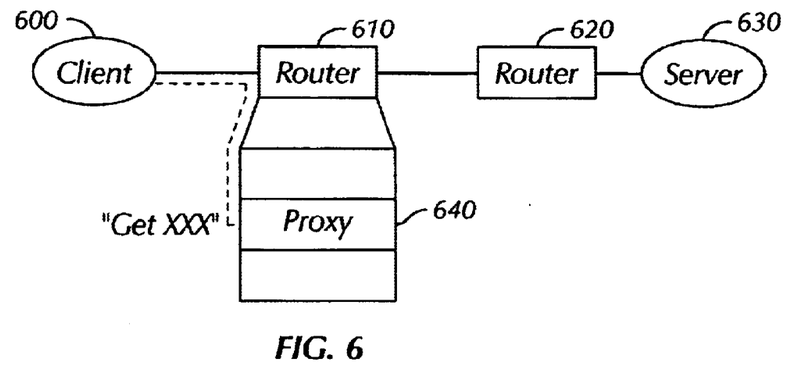
FIG. 6 is a block diagram of one application of the inventive techniques for implementation of a transparent proxy.

FIG. 6 is a block diagram of one application of the techniques of the invention. As shown in FIG. 6, a client 600 is linked to a sever 630 over routers 610 and 620 which constitutes part of the network or internetwork servicing the client. Although only two routers are shown, it is clear that a arbitrary number of routers may be involved in routing through the network. When a client issues a GET request directed to the server, it would be forwarded to router, in this case router 610, for selection of a route going in a direction toward the server. If the router has been configured to maintain a cache of retrieved pages, the router can serve as a transparent proxy for one or more servers in the network. The router 610, upon receipt of the GET request from the client 600, directs it to a process functioning as a proxy on the router. This process is described more in conjunction with FIG. 7.

Figure 7:
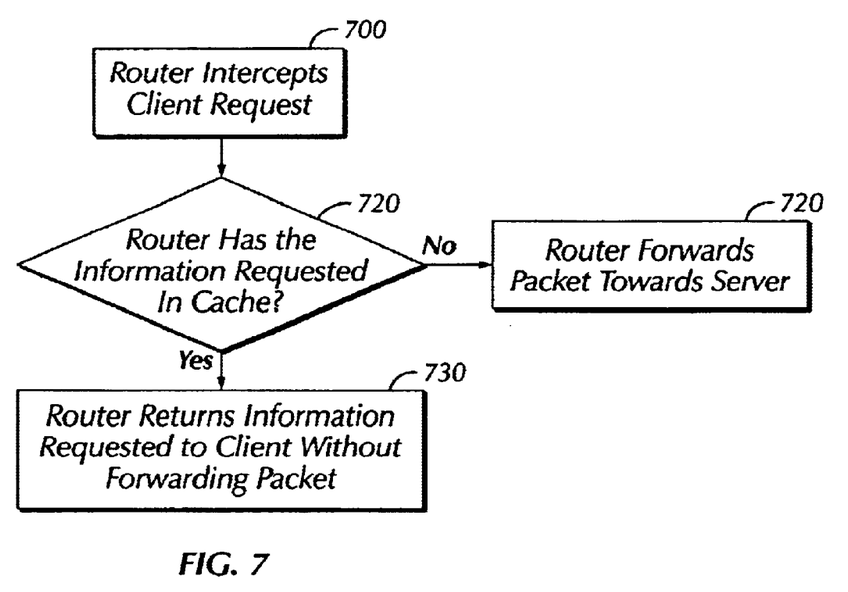
FIG. 7 is a flow chart of a process used in a router implementing a transparent proxy.

As shown in FIG. 7, a router intercepts a client request for information, such as a HTTP GET request (700). The router checks to see if it has that information stored in cache (710). If it does not, (710-N) the router forwards a packet in the direction of the server (720). If, however, the router does have the information requested in cache (710-Y), the router returns the information requested to the client without forwarding the packet (730). This process is particularly facilitated where the router maintains cache of small size data transfers such as those utilizable conveniently with UDP. Thus, when the router 610 receives a UDP request from the client, it can check very quickly to see whether or not it has the requested information cached. If it does, it can forward quickly the UDP response packet and fulfill the client's request transparently without the client ever knowing that the router served as a proxy to the request sent to the server. Note that such a transparent proxy interaction would be much harder in a TCP environment because the intermediate router will need to serve as the conduit for the reply from the server; this requires maintaining state and an intimate interface with the routing system which is frequently not accessible.

By utilizing the UDP/TCP fall back protocol in accordance with the invention, the routers may serve as efficient and scalable transparent proxies between the client and server thus providing better response times, greater efficiencies and reduction in network traffic.

Figure 8:
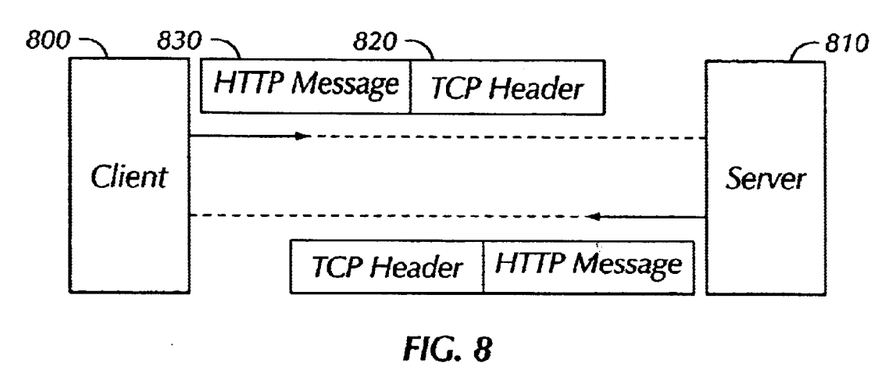
FIG. 8 illustrates a communication sequence showing a packet format used for a TCP exchange.

FIG. 8 illustrates a communication sequence showing packet format used for a TCP exchange. The particular format utilized for an information exchange between a client 800 and a server 810 is shown in FIG. 8. An HTTP message or packet 830 is wrapped inside an envelope having a TCP header 820 for transfer to the server. Typically the TCP header includes the port number and connection identification information needed to set up the connection. When the packet arrives at the server 810, the server utilizes the TCP header information 820 to formulate it's own TCP header for a packet to be sent back to the client. The packet sent by the server to the client also has the HTTP message which may include part or all of the data requested. The HTTP message may also be a HTTP redirect or other information.

Figure 9:
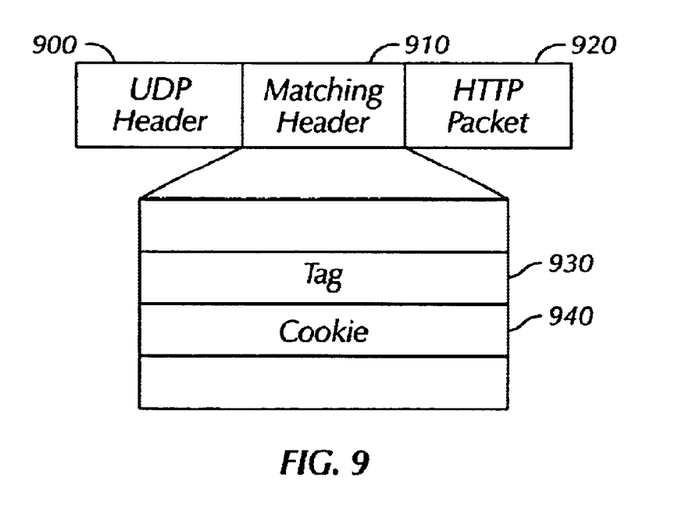
FIG. 9 illustrates a modified packet format preferred when used with a UDP exchange.

FIG. 9 illustrates a modified packet format preferred when used with a UDP exchange according to the invention. When using UDP, there is a UDP header 900, preferably followed by a matching header 910 followed by the HTTP packet information 920. When arranging the UDP packets in this manner, multiple UDP request may be outstanding on a single port of a communications board. On the contrary, when utilizing TCP, it is preferred that each TCP connection have a dedicated port. When the client initiates a UDP request, it generates the UDP header 900, and the HTTP packet information 920 that are desired to be transmitted. It also generates a matching header 910 by including, internally, a tag 930 and a cookie 940. The tag is a small numeric value which permits fast matching with information stored. For example, the tag could include a three bit representation of the numbers 0–7 thus when the client sends out a HTTP GET request in field 920 over a port number specified in the UDP header 900, the matching header will contain a numeric in the tag field between 0 and 7. One may assume for purposes of explanation, that this is the third UDP request sent out over port 19 of the communications board in the client. When the server receives the UDP header information, it extracts the information needed from the header, including the port identification number, and it extracts the information from the matching header which identifies tag "3" in the example together with the cookie 940 associated with the tag 930. The server then formulates a packet having substantially this same format as shown in FIG. 9 for returning to the client. However, the HTTP packet information will differ from the material sent by the client to the server. It may be, for example, a response to the HTTP GET request sent by the client or, as another example, it may be an HTTP redirect request. The UDP packet formulated by the server is then sent back to the client and directed to the port number specified in the UDP header. Since multiple queries may be outstanding on a given port, the tag is used to associate the response with the query that was sent out on the UDP packet sent from the client to the server. Thus, in the example previously identified, the tag will associate the response from the server with the query sent from the client under the same tag number.

Under certain circumstances, a malicious interloper may try to hijack the UDP connection and provide false information. Since the tag numbers are small numerics and could be quickly guessed, the cookie information 940 is provided. The cookie can be, for example, any sequence, preferably alpha numeric, which can serve as a validation that information received under a particular tag number of the incoming UDP packet has a cookie which matches the cookie sent from by the client to the server and thus, since the cookie transaction cannot be easily guessed, serves as a validation that the response has been received from a server to which the cookie was originally sent.

Figure 10A:
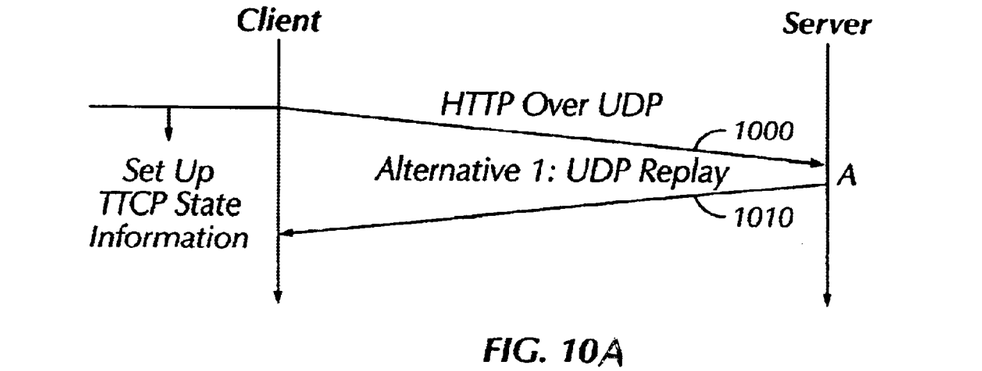
FIGS. 10A, 10B and 10C are illustrations of communication sequences which can occur when implementing a three step fall back protocol in accordance with a second embodiment of the invention.
Figure 10B:
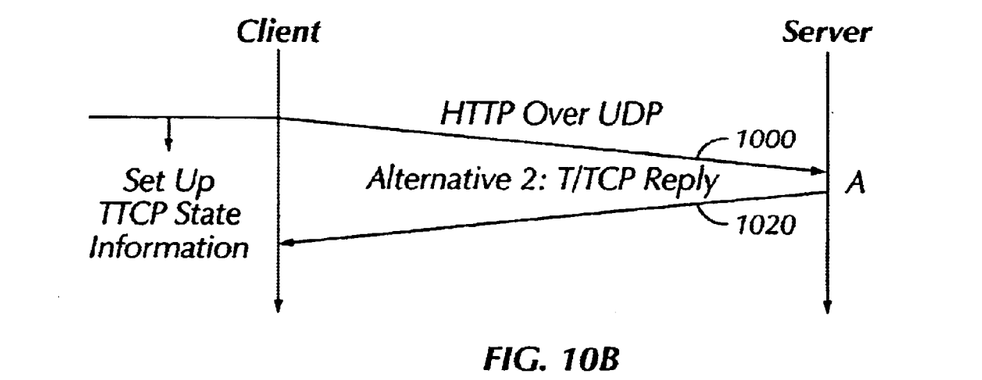
Figure 10C:
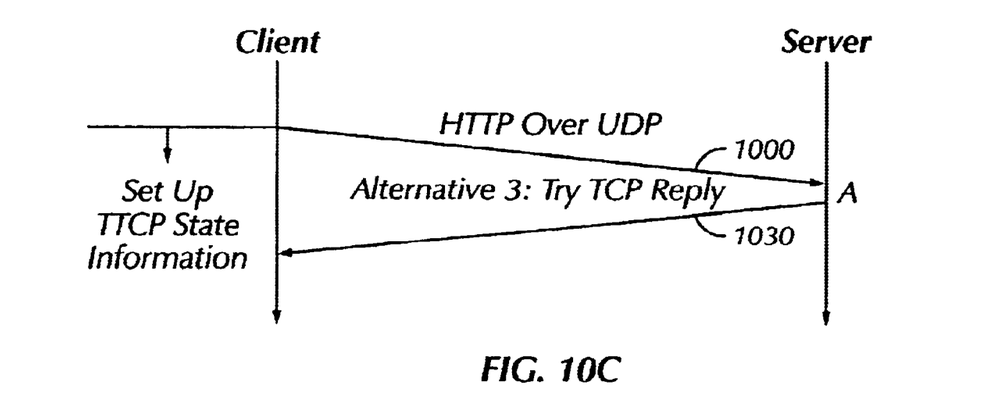

FIGS. 10A, 10B and 10C are illustrations of communication sequences which can occur when implementing a three step fall back protocol in accordance with a second embodiment of the invention. In each of FIGS. 10A, 10B and 10C, when a client sends a HTTP request over UDP (1000), the client may also substantially simultaneously set up transaction TCP state information (T/TCP State Information) in memory. When the server receives a packet at time A, it can respond in one of three ways. As shown in FIG. 10A, it can reply with the UDP reply message (1010). Depending on server policy, this would normally be done when the information requested is of a small enough size as to be amenable to a UDP transfer, e.g. that is, of a size sufficient to fit into a single UDP reply packet. If the amount of information to be transferred back to the client is greater than that which can be accommodated by a UDP packet, the server policy may dictate some form of TCP may be utilized. Server policy may include criteria other than the size of the data transfer. For example, the policy may specify a particular reply alternative when the data transfer will go over a high loss link. Alternative 2, shown in FIG. 10B, is utilized when the server is equipped with transaction TCP. If it is, the server will respond (1020) to the UDP request (1000) utilizing the transaction,TCP (T/TCP) protocol. Since the client has already established transaction TCP state information, the use of transaction TCP for the reply is very efficient. In addition, transaction TCP can handle responses which require a plurality of packets to be transferred. As shown in FIG. 10C, if the server is not equipped with transaction TCP, then the server responds (alternative 3) with a message to try a regular TCP approach by invoking the sequences shown in FIG. 2 for a transfer. Thus, there are three response modes available. First, a UDP reply, second a transaction TCP reply and third a general TCP reply. These will be invoked progressively if a UDP reply is inappropriate.

Figure 11:
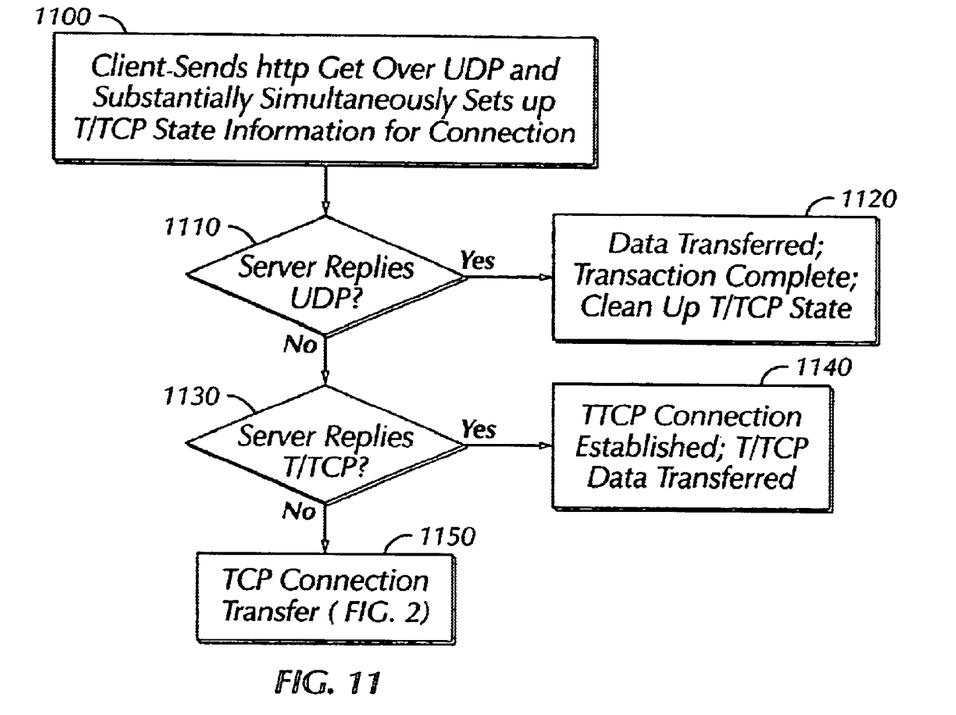
FIG. 11 is a flow chart of a three step fall back protocol of the second embodiment.

FIG. 11 is a flow chart of the three step fall back protocol in the second embodiment of the invention. As shown in FIG. 11, the client sends a HTTP GET request over UDP and substantially simultaneously sets up the T/TCP state information for a possible connection (1100). If the server replies UDP (1100-Y), the data is transferred and the transaction is complete (1120). The server does not reply UDP (1110-N), the client checks to see if the server replied with transaction TCP (1130). If it did (1130-Y), a transaction TCP connection is established and the data is transferred using transaction TCP (1140). If the server does not reply transaction TCP (1130-N), a TCP connection transfer is established as shown in FIG. 2 (1150).

Figure 12:
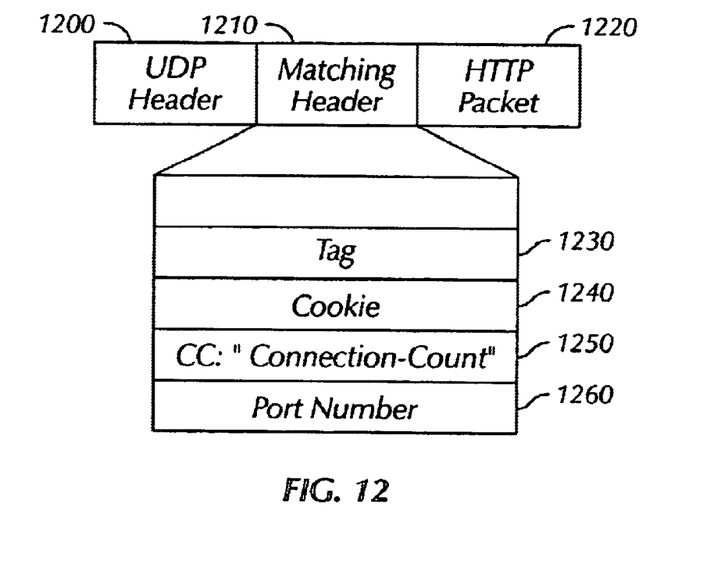
FIG. 12 illustrates an alternative version of the matching header preferably used when using the three step fall back of the second embodiment of the invention.

FIG. 12 illustrates an alternative version of the matching header preferably used when the three step fall back protocol of the second embodiment is utilized. The UDP header 1200, matching header 1210 and HTTP packet 1220 function substantially as discussed in conjunction with FIG. 9. However, the matching header 1210 is supplemented with a connection count 1250 and a port number 1260. This is discussed in conjunction with FIG. 9. When utilizing UDP, a single port may handle simultaneously a plurality of outstanding requests. However, when utilizing transaction TCP or TCP, it is preferable to use only one port per connection. The matching header 1210 is utilized to include the connection count field 1250 in port number 1260 to facilitate the information needed for establishing a transaction TCP connection in the event that the server responds requesting a transaction TCP exchange. This information is utilized in conjunction with the state information stored by the client as discussed in conjunction with FIGS. 10 and 11. Thus, by extending the matching header, a return UDP packet can be utilized to establish a transaction TCP connection without the overhead required to establish a TCP connection.

Figure 13A:
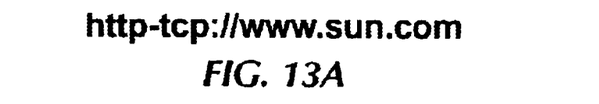
FIGS. 13A, 13B and 13C are illustrations of explicit extensions of URL syntax to distinguish three modes of correction request in accordance with one aspect of this invention.
Figure 13B:
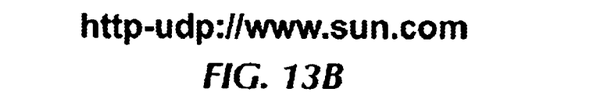
Figure 13C:
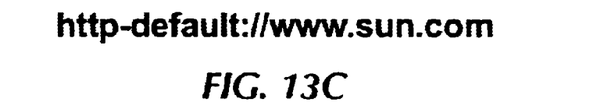

FIGS. 13A, 13B and 13C are illustrations of explicit extensions of a URL syntax to distinguish the three modes of connection request in accordance with one aspect of the invention. The HTTP protocol identification portion of the URL is extended to distinguish specific modes using a hyphenated suffix. This allows one to distinguish the three types of connections. If one desires to expressly request the TCP connection, one utilizes the format shown in FIG. 13A. When one desires to utilize a UDP connection, the syntax shown in FIG. 13B is utilized. When one desires to utilize the fall back approach, in which a UDP request is sent initially and either a UDP response or a "Try TCP" response is received from the server, the syntax shown in FIG. 13C is utilized. Thus, by extending the expression of the HTTP protocol, one can extend the syntax to account for the various communications options available expressly.

Figure 14A:
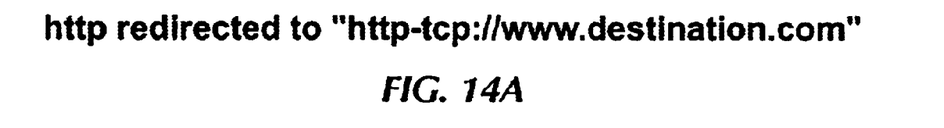
FIG. 14A illustrates a reply format using an HTTP redirect syntax to switch from one server to another while simultaneously switching response modes.

FIG. 14A illustrates a reply format utilizing a HTTP redirect syntax to switch from one server to another while simultaneously switching response modes. When a UDP request is made to a server and the server desires to redirect the connection to a new destination, while, at the same time, for example knowing that the size of the amount of information requested is greater than can be accommodated by UDP or that the server is not equipped with transaction TCP, the server may respond by simultaneously specifying the new destination to which the connection is to be directed and by specifying the mode of the connection requested that should be presented to the new destination. Thus, the HTTP redirect will direct communications with the new server destination URL while at the same time specifying "HTTP-TCP" as a particular species of the HTTP protocol to be invoked.

Figure 14B:
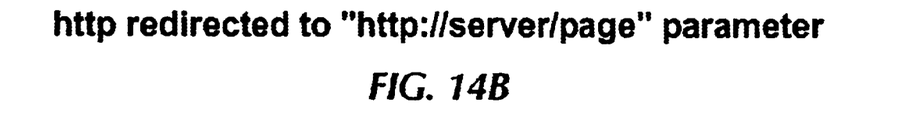
FIG. 14B shows an extension to an HTTP redirect message in which the response mode is specified as an extension to URL.

FIG. 14B shows an extension to an HTTP redirect message in which the response is specified as an extension to the URL. FIG. 14B, the particular species of the communications available for the HTTP redirect can be specified as a parameter appended to the new destination address. For example, the parameter could be TCP, UDP, or ANY in this way, one can specify the communication mode as a parameter to an HTTP redirect and further minimize traffic across the network.

The approach described herein permits proxies to be implemented in a particularly simple and advantageous fashion. In one form, a proxy can be implemented at a router. The router maintains a cache of pages received. When a UDP query packet is received at the router, if the information requested is stored in cache, it is retrieved and sent to the originator of the query packet. Otherwise the packet is forwarded to the server. Alternatively, the proxy can be implemented separately from a router. In this implementation, the proxy requests the router to direct packets of interest to the proxy rather than directly to the server.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. Apparatus for engaging in communications, comprising:
    a. a communications interface; and
    b. a processor, connected to said communications interface and configured to initiate communications over said communications interface using a connectionless protocol and to simultaneously store state information needed for a connection using Transaction TCP (T/TCP).

2. Apparatus of claim 1 in which the processor is further configured to selectively complete a communications exchange using the connectionless protocol or to acknowledge a T/TCP connection depending upon a response received over said communications interface.

3. In a network having at least one computing device configured to run a client process and at least one computer device configured to run a server process, a computer device connected to said network, said computer device comprising:
    a. at least one input communications interface;
    b. at least one output communications interface;
    c. a cache memory; and
    d. a computing device running a process for receiving network packets arriving at said input communications interface, and for checking to see if information requested in a query packet formatted in a connectionless protocol directed to a server process can be satisfied by information stored in said cache memory and, if it can, providing the information stored in the cache memory to the originator of the query packet and, if it can not, forwarding the query packet to an output communications interface going toward the location of the server process.

4. A method of initiating communications with a remote station over a communications link, comprising the step of:
    a. initiating communications with said remote station using a connectionless protocol and substantially simultaneously storing state information needed for a connection using Transaction TCP (T/TCP).

5. A method of communicating information in a network, comprising the steps of:
    a. selecting incoming packets from a link of said network which are formatted in a connectionless protocol;
    b. identifying whether incoming packets, of those selected, request information stored locally in a cache; and
    c. if they are, returning the information stored locally to the originator of the selected and identified incoming packet, or otherwise forward the incoming packet toward its destination.

6. A computer program product, comprising:
    a. a memory medium; and
    b. a computer program stored on said memory medium, said computer program comprising instructions for initiating communications with a remote station using a connectionless protocol and substantially simultaneously storing state information needed for a connection using Transaction TCP (T/TCP).

7. A computer program product, comprising:
    a. a memory medium; and
    b. a computer program stored on said memory medium, said computer program comprising instructions for selecting incoming packets from a link of a network which are formatted in a connectionless protocol, identifying whether incoming packets of those selected request information stored locally in a cache; and if they do, returning the information stored locally to the originator of the selected and identified incoming packet, or otherwise forwarding the incoming packet toward its destination.

8. A computer program transmitted as a carrier wave, said computer program comprising instructions for initiating communications with a remote station using a connectionless protocol and substantially simultaneously storing state information needed for a connection using Transaction TCP (T/TCP).

9. A computer program transmitted as a carrier wave, said computer program comprising instructions for selecting incoming packets from a link of a network which are formatted in a connectionless protocol, identifying whether incoming packets of those selected request information stored locally in a cache; and if they do, returning the information stored locally to the originator of the selected and identified incoming packet, or otherwise forwarding the incoming packet toward its destination.

* * * * *